Patented Mar. 26, 1940

2,195,289

UNITED STATES PATENT OFFICE 2,195,289

2- AND 2:7-DI-ALKYLARYLCARBAMYLFLUORENES AND FLUORENE-2- AND 2:7-DICARBOXYLIC ACIDS AND A PROCESS OF MAKING THEM

George Sheldrick and Max Wyler, Blackley, Manchester, England, assignors to Imperial Chemical Industries Limited, a corporation of Great Britain No Drawing. Application January 27, 1938, Serial No. 187,320. In Great Britain January 27, 1937

7 Claims. (Cl. 260—558)

This invention relates to the manufacture of new intermediates for the manufacture of dyestuffs.

With the exception of fluorene-2-carboxylic acid they are new compounds. Fortner, Monatshefte, 25, 446–8 described making fluorene-2-carboxylic acid by nitrating fluorene to 2-nitrofluorene, reducing this to the amine, converting the amine to the nitrile and hydrolysing the nitrile.

This invention has as an object to provide new intermediates for the manufacture of dyestuffs. A further object is to devise a new method of manufacturing dyestuff intermediates. A still further object is to devise a method of manufacturing 2 and 2:7-dialkylarylcarbamyl-fluorenes and fluorene-2:7-dicarboxylic acid. A still further object is to devise a new method of manufacturing fluorene-2-carboxylic acid.

Further objects will appear hereinafter.

These objects are accomplished by the following invention. We have found that fluorene will readily interact with alkylarylcarbamyl halides in the presence of anhydrous aluminium chloride to give 2- and 2:7-di-alkylarylcarbamyl-fluorenes and that these are readily converted to the corresponding 2- and 2:7-di-carboxylic acids by treating them with strong acid or strong alkaline hydrolysing agents.

The term "aryl" with the further limitation in which the aryl radical is of the benzene series is used to include the aromatic monovalent radicals of the benzene series; e. g. phenyl, o-talyl, m-tolyl, p-tolyl, xylyl, o-chlorophenyl, etc.

The interaction of the fluorene and alkylarylcarbamyl halides may be carried out with or without an inert diluent. Chlorobenzene is a suitable inert diluent for making the 2-derivatives and p-dichlorobenzene for making the 2:7-derivatives. Interactions may also be effected in the medium, which is obtained by using a mixture of sodium chloride and anhydrous aluminium chloride.

The following examples in which parts are by weight illustrate but do not limit the invention.

Example 1

83 parts of fluorene, and 120 parts of ethylphenylcarbamyl chloride are powdered and suspended in 166 parts of chlorobenzene. 86 parts of finely-powdered anhydrous aluminium chloride are then added gradually with stirring. The resulting mixture is allowed to stand for 18 hours with stirring, then heated at 100° C. for 2 hours, cooled, decomposed with a mixture of 300 parts of ice and 32 parts of hydrochloric acid, allowed to stand at 0° C. for 1–2 hours, then filtered, washed with cold water (containing a little hydrochloric acid) and dried at 100° C. The yield of 2-ethylphenylcarbamylfluorene is 140 parts (90% of the theoretical calculated on the fluorene used) of M. P. 167–169° C. It recrystallises from glacial acetic acid in fine colourless prisms, M. P. 163° C. (Analysis: Nitrogen, found 4.6% calculated 4.8%). It has the probable formula.

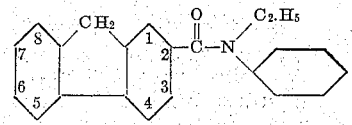

By using methylphenylcarbamyl chloride instead of ethylphenylcarbamyl chloride, 2-methylphenylcarbamylfluorene can be obtained.

Example 2

140 parts of 2-ethylphenylcarbamylfluorene obtained as in Example 1, are gently boiled, with stirring under reflux, with 400 parts of 65% sulphuric acid for 2 hours. The product melts and goes oily, and the acid then appears as a fine sandy white powder. When hydrolysis is complete the mixture is cooled, diluted with 500 parts of water, and filtered. The precipitate is dissolved in 2000 parts of hot dilute sodium carbonate solution, filtered from any tarry matter, and the filtrate acidified with hydrochloric acid whilst hot. The resulting precipitate is filtered and washed with boiling water, and impurities then extracted with water, filtered, washed with water and dried at 100° C.

The yield of fluorene-2-carboxylic acid is 85 parts (80% of the theoretical yield calculated on the fluorene) of M. P. 274–276° C. It crystallises from glacial acetic acid in fine white prisms of M. P. 278° C.

2-ethylphenylcarbamylfluorene may be hydrolysed to fluorene-2-carboxylic acid also by heating with alcoholic caustic potash solution at 120–130° C.

Example 3

33.2 parts of fluorene, 107 parts of anhydrous aluminium chloride, and 27 parts of sodium chloride are well ground together, then 147 parts of ethylphenylcarbamyl chloride, also finely-powdered, are added gradually with good mixing. The temperature rises to 60° C. gaseous hydrochloric acid is evolved, and the mixture goes molten. Heating is continued at 120° C. with stirring for half an hour, the temperature is raised during half an hour to 150° C., kept there for about 10 minutes until a test portion after boiling up with water and drying dissolves without difficulty in methyl alcohol.

The mixture is cooled and decomposed by carefully adding 210 parts of warm 2% hydrochloric acid. The supernatant liquor is decanted off, the residue is shaken with a little warm water and a little hydrochloric acid. This is decanted off, and the residue is then dissolved in the smallest amount of boiling methyl alcohol (about 180 parts), allowed to stand at 0° C. for 3-4 hours, and then filtered and dried at 100° C. The yield of 2:7-di(ethylphenylcarbamyl)fluorene is 84 parts (91% of the theoretical) M. P. 170-172° C. The product crystallises from benzene in white needles M. P. 174-175° C. (Analysis: Nitrogen, found 6.1%, calculated 6.1%) It has the probable formula.

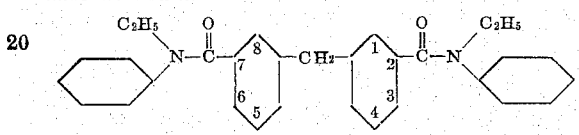

2:7-di(propylphenylcarbamyl)fluorene and 2:7-di(ethyl-o-tolyl)fluorene may be made in a similar way by using a propylphenylcarbamyl chloride and ethyl-o-tolylcarbamyl chloride respectively instead of ethylphenylcarbamyl chloride.

*Example 4*

84 parts of 2:7-di(ethylphenylcarbamyl-fluorene are gently boiled with 500 parts of 65% sulphuric acid, with a stirring for 2 hours. The solid dissolves in the boiling acid, but after a time the dicarboxylic acid comes out of solution as a fine greyish-white powder. When hydrosysis is complete the mixture is diluted with 200 parts of water, filtered and washed with water. It is dissolved in 1000 parts of boiling water containing a little dissolved sodium carbonate and a little decolouring carbon, filtered and acidified hot. The resulting precipitate which is very voluminous, is filtered, boiled with 1000 parts of water, filtered, washed thoroughly with boiling water, and dried at 100° C. A good yield of fluorene-2:7 di-carboxylic acid is obtained. (Analysis, found, C: 70.2%, H: 3.9%, calculated C: 70.87%, H: 3.9%). It has the probable formula.

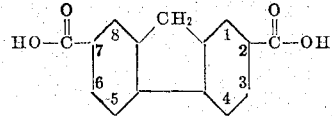

Methylphenylcarbamyl chloride, ethylphenylcarbamyl chloride, ethylphenylcarbamyl bromide, propylphenylcarbamyl chloride, ethyl-o-tolylcarbamyl chloride, ethyl-p-tolylcarbamyl) chloride and methylxylylcarbamyl chloride are examples of suitable alkylarylcarbamyl halides. Alkylarylcarbamyl halides are starting materials which are easily prepared and convenient to handle. When the alkylarylcarbamylfluorenes are made only for the purpose of subsequently hydrolysing them to carboxylic acids, the most convenient one to use is ethylphenylcarbamyl chloride (which is also called ethylphenylurea chloride) because this is one of the easiest to prepare, e. g. from monoethyl-aniline and phosgene, and because in the subsequent hydrolysis of the ethylphenylcarbamylfluorenes, monoethyl-aniline is obtained and this can be used in making ethylphenylcarbamyl chloride again.

This invention is a valuable advance in the art, as it discloses a method of manufacturing new and valuable intermediates for the manufacture of dyestuffs and a new and convenient method of manufacturing fluorene-2-carboxylic acid. The processes give a very good yield of products.

As many apparently widely different embodiments of this invention may be made without departing from the spirit and scope thereof it is to be understood that we do not limit ourselves to the specific embodiments thereof except as defined in the appended claims.

We claim:

1. In the process for the preparation of dialkylarylcarbamylfluorenes and fluorene carboxylic acids, in which the aryl group is of the benzene series, the step which comprises reacting fluorene with an alkylarylcarbamyl halide in the presence of anhydrous aluminum chloride.

2. In the process for the manufacture of fluorene carboxylic acids, the steps which comprise reacting fluorene with an alkylarylcarbamyl halide in which the aryl radical is of the benzene series in the presence of anhydrous aluminum chloride and treating the resulting alkylarylcarbamylfluorene with a strong hydrolysing agent of the class consisting of acid and alkaline hydrolysing agents.

3. Fluorene derivatives of the class consisting of 2-alkylarylcarbamylfluorene, 2:7-di-alkylarylcarbamylfluorene, in which the aryl radical is of the benzene series, and the hydrolysis product of the 2, 7-dialkylarylcarbamylfluorene consisting of the 2:7-fluorene di-carboxylic acid.

4. As new compounds, the alkylarylcarbamylfluorenes of the class consisting of 2-alkylarylcarbamylfluorene and 2:7-di-alkylarylcarbamylfluorenes in which the aryl groups are of the benzene series.

5. The process of claim 1 in which the acid halide is ethylarylcarbamyl chloride.

6. The process of claim 1 in which the acid halide is ethylphenylcarbamyl chloride.

7. Compounds of the class consisting of 2-ethylphenylcarbamylfluorene and 2:7-di-ethylphenylcarbamylfluorene.

GEORGE SHELDRICK.
MAX WYLER.